United States Patent
Petitpont et al.

(10) Patent No.: US 12,148,233 B1
(45) Date of Patent: Nov. 19, 2024

(54) SYSTEMS AND METHODS FOR AI GENERATION OF IMAGE CAPTIONS ENRICHED WITH MULTIPLE AI MODALITIES

(71) Applicant: Newsbridge SAS, Boulogne Billancourt (FR)

(72) Inventors: Frédéric Petitpont, Velizy Villacoublay (FR); Yannis Tevissen, Paris (FR); Khalil Guetari, Le Chesnay-Rocquencourt (FR)

(73) Assignee: Newsbridge SAS, Boulogne Billancourt (FR)

( * ) Notice: Subject to any disclaimer, the term of this patent is extended or adjusted under 35 U.S.C. 154(b) by 0 days.

(21) Appl. No.: 18/659,800

(22) Filed: May 9, 2024

(51) Int. Cl.
*G06K 9/00* (2022.01)
*G06V 10/764* (2022.01)
(Continued)

(52) U.S. Cl.
CPC ............ *G06V 20/70* (2022.01); *G06V 10/764* (2022.01); *G06V 20/41* (2022.01); *G06V 40/172* (2022.01)

(58) Field of Classification Search
CPC .... G06V 10/82; G06V 10/764; G06V 10/454; G06V 20/47; G06V 10/774; G06V 10/811; G06V 20/20; G06V 20/60; G06V 30/10; G06V 30/1463; G06V 30/19173; G06V 30/262; G06V 30/412; G06V 30/414; G06N 3/08; G06N 3/045; G06N 3/04; G06N 3/0455; G06N 3/048; G06N 3/0895;
(Continued)

(56) References Cited

U.S. PATENT DOCUMENTS 9,690,991 B2  6/2017  Wnuk et al.
10,417,501 B2  9/2019  Ashour et al.
(Continued)

FOREIGN PATENT DOCUMENTS

EP    2681717 A2    1/2014

OTHER PUBLICATIONS

Munusamy, H., C, C.S. Multimodal attention-based transformer for video captioning. Appl Intell 53, 23349-23368 (2023) (Year: 2023).*
(Continued)

*Primary Examiner* — Alex Kok S Liew
(74) *Attorney, Agent, or Firm* — GREENBERG TRAURIG, LLP

(57) ABSTRACT

Systems and methods of the present disclosure enable enriching an artificial intelligence (AI)-generated caption including a textual description of an image. The image and the textual description is input into vision transformer model to produce heat map for the image, the heat map including a representation of a degree of significance of portion of the image to an identification of an item in the textual description based at least in part on the gradient. The image is input into an expert recognition machine learning model to output bounding box including label representative of the item. A spatial alignment within the image between the bounding box and the portion of the heat map is determined. The textual description of the AI-generated caption is modified to include the label of the item based on the spatial alignment within the image so as to produce a modified AI-generated caption associated with the item.

20 Claims, 8 Drawing Sheets

(51) Int. Cl.
*G06V 20/40* (2022.01)
*G06V 20/70* (2022.01)
*G06V 40/16* (2022.01)

(58) Field of Classification Search
CPC ...... G06N 3/0464; G06N 3/096; G06N 20/00; G06N 3/084; G06N 3/088; G06N 5/01
See application file for complete search history.

(56) References Cited

U.S. PATENT DOCUMENTS 10,997,395 B2    5/2021    Olgiati
2009/0292685 A1    11/2009    Liu et al.

OTHER PUBLICATIONS

L. Chen, J. Chen, H. Hajimirsadeghi and G. Mori, "Adapting Grad-CAM for Embedding Networks," 2020 IEEE Winter Conference on Applications of Computer Vision (WACV), Snowmass, CO, USA, 2020, pp. 2783-2792 (Year: 2020).*
Y. Li et al., "Semantic-Guided Selective Representation for Image Captioning," in IEEE Access, vol. 11, pp. 14500-14510, 2023 (Year: 2023).*
S. He et al., "Image Captioning through Image Transformer." Asian Conference on Computer Vision (2020) (Year: 2020).*
Z. Shao et al., "Region-Object Relation-Aware Dense Captioning via Transformer," in IEEE Transactions on Neural Networks and Learning Systems, Mar. 2022 (Year: 2022).*

* cited by examiner

SYSTEMS AND METHODS FOR AI GENERATION OF IMAGE CAPTIONS ENRICHED WITH MULTIPLE AI MODALITIES

FIELD OF TECHNOLOGY

The present disclosure generally relates to computer-based systems and methods for AI generation of image captions enriched with multiple AI modalities, including leveraging explainable AI techniques to improve the fusion of expert systems into generalized deep learning models.

BACKGROUND OF TECHNOLOGY

The technology of image captioning using deep learning techniques can serve numerous use cases but the results are not always reliable. Indeed, when the image contains the face of a person that is absent or not prominent in the training dataset, image captioning systems struggle to correctly name the person. In that case, either the model hallucinates a name or outputs a generic sentence. Such errors may lead to many biases one can observe when using the model.

SUMMARY

In some aspects, the techniques described herein relate to a method including: obtaining, by at least one processor, at least one image; obtaining, by the at least one processor, an artificial intelligence (AI)-generated caption including at least one textual description of the at least one image; wherein the at least one textual description includes at least one identification of at least one item in the at least one image; inputting, by the at least one processor, the at least one image and the at least one textual description into at least one vision transformer model to produce at least one heat map for the at least one image; wherein the at least one heat map includes a representation of a degree of significance of at least one portion of the at least one image to the at least one identification of the at least one item in the at least one textual description based at least in part on the at least one gradient; inputting, by the at least one processor, the at least one image into an expert recognition machine learning model to output at least one bounding box including at least one label representative of the at least one item; determining, by the at least one processor, for the at least one image, a spatial alignment within the at least one image between the at least one bounding box and the at least one portion of the at least one heat map; and modifying, by the at least one processor, the at least one textual description of the AI-generated caption to include the at least one label of the at least one item based on the spatial alignment within the at least one image so as to produce a modified AI-generated caption associated with the at least one item.

In some aspects, the techniques described herein relate to a method, wherein the at least one vision transformer model includes at least one encoder and at decoder; and wherein the at least one image is input into the decoder and output by the encoder to as to produce the at least one heat map.

In some aspects, the techniques described herein relate to a method, wherein the expert recognition machine learning model includes at least one face recognition machine learning model configured to output at least name associated with at least one face detected in the at least one image.

In some aspects, the techniques described herein relate to a method, further including: determining, by the at least one processor, at least one person in the at least one image based at least in part on at least one word of the at least one textual description being representative of the at least one person; determining, by the at least one processor, that the at least one person and the at least one face match based at least in part on the spatial alignment; and modifying, by the at least one processor, the at least one textual description by replacing the at least one word associated with the at least one person with the at least one name associated with the at least one face to produce at least one enriched textual description.

In some aspects, the techniques described herein relate to a method, further including: determining, by the at least one processor, based on at least one rule, that the at least one identification of the at least one item is associated with the expert recognition machine learning model; and inputting, by the at least one processor, the at least one image into the expert recognition machine learning model in response to the at least one identification of the at least one item being associated with the expert recognition machine learning model.

In some aspects, the techniques described herein relate to a method, further including utilizing, by the at least one processor, at least one AI captioning model to generate the at least one textual description based at least in part on the at least one image.

In some aspects, the techniques described herein relate to a method, further including: receiving, by the at least one processor, at least one search query including at least one search term; determining, by the at least one processor, that the at least one search term of the at least one search query matches to the at least one enriched textual description; and returning, by the at least one processor, the at least one image in response to the at least one search query based at least in part on the at least one search term matching to the at least one enriched textual description.

In some aspects, the techniques described herein relate to a method, further including: modifying, by the at least one processor, an order of words in the at least one textual description based at least in part on the at least one heat map and at least one ordering rule.

In some aspects, the techniques described herein relate to a method, wherein the at least one image includes at least one frame of a video.

In some aspects, the techniques described herein relate to a method, wherein the video includes a live-stream.

In some aspects, the techniques described herein relate to a system including: at least one processor that, upon executing software instructions, is configured to: obtain at least one image; obtain an artificial intelligence (AI)-generated caption including at least one textual description of the at least one image; wherein the at least one textual description includes at least one identification of at least one item in the at least one image; input the at least one image and the at least one textual description into at least one vision transformer model to produce at least one heat map for the at least one image; wherein the at least one heat map includes a representation of a degree of significance of at least one portion of the at least one image to the at least one identification of the at least one item in the at least one textual description based at least in part on the at least one gradient; input the at least one image into an expert recognition machine learning model to output at least one bounding box including at least one label representative of the at least one item; determine for the at least one image, a spatial alignment within the at least one image between the at least one bounding box and the at least one portion of the at least one heat map; and modify the at least one textual description of the AI-generated caption to include the at least one label of the at least one item based on the spatial alignment within the at least one image so as to produce a modified AI-generated caption associated with the at least one item.

In some aspects, the techniques described herein relate to a system, wherein the at least one vision transformer model includes at least one encoder and at decoder; and wherein the at least one image is input into the decoder and output by the encoder to as to produce the at least one heat map.

In some aspects, the techniques described herein relate to a system, wherein the expert recognition machine learning model includes at least one face recognition machine learning model configured to output at least name associated with at least one face detected in the at least one image.

In some aspects, the techniques described herein relate to a system, wherein the at least one processor is further configured to: determine at least one person in the at least one image based at least in part on at least one word of the at least one textual description being representative of the at least one person; determine that the at least one person and the at least one face match based at least in part on the spatial alignment; and modify the at least one textual description by replacing the at least one word associated with the at least one person with the at least one name associated with the at least one face to produce at least one enriched textual description.

In some aspects, the techniques described herein relate to a system, wherein the at least one processor is further configured to: determine based on at least one rule, that the at least one identification of the at least one item is associated with the expert recognition machine learning model; and input the at least one image into the expert recognition machine learning model in response to the at least one identification of the at least one item being associated with the expert recognition machine learning model.

In some aspects, the techniques described herein relate to a system, wherein the at least one processor is further configured to utilize at least one AI captioning model to generate the at least one textual description based at least in part on the at least one image.

In some aspects, the techniques described herein relate to a system, wherein the at least one processor is further configured to: receive at least one search query including at least one search term; determine that the at least one search term of the at least one search query matches to the at least one enriched textual description; and return the at least one image in response to the at least one search query based at least in part on the at least one search term matching to the at least one enriched textual description.

In some aspects, the techniques described herein relate to a system, wherein the at least one processor is further configured to: modify an order of words in the at least one textual description based at least in part on the at least one heat map and at least one ordering rule.

In some aspects, the techniques described herein relate to a system, wherein the at least one image includes at least one frame of a video.

In some aspects, the techniques described herein relate to a system, wherein the video includes a live-stream.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
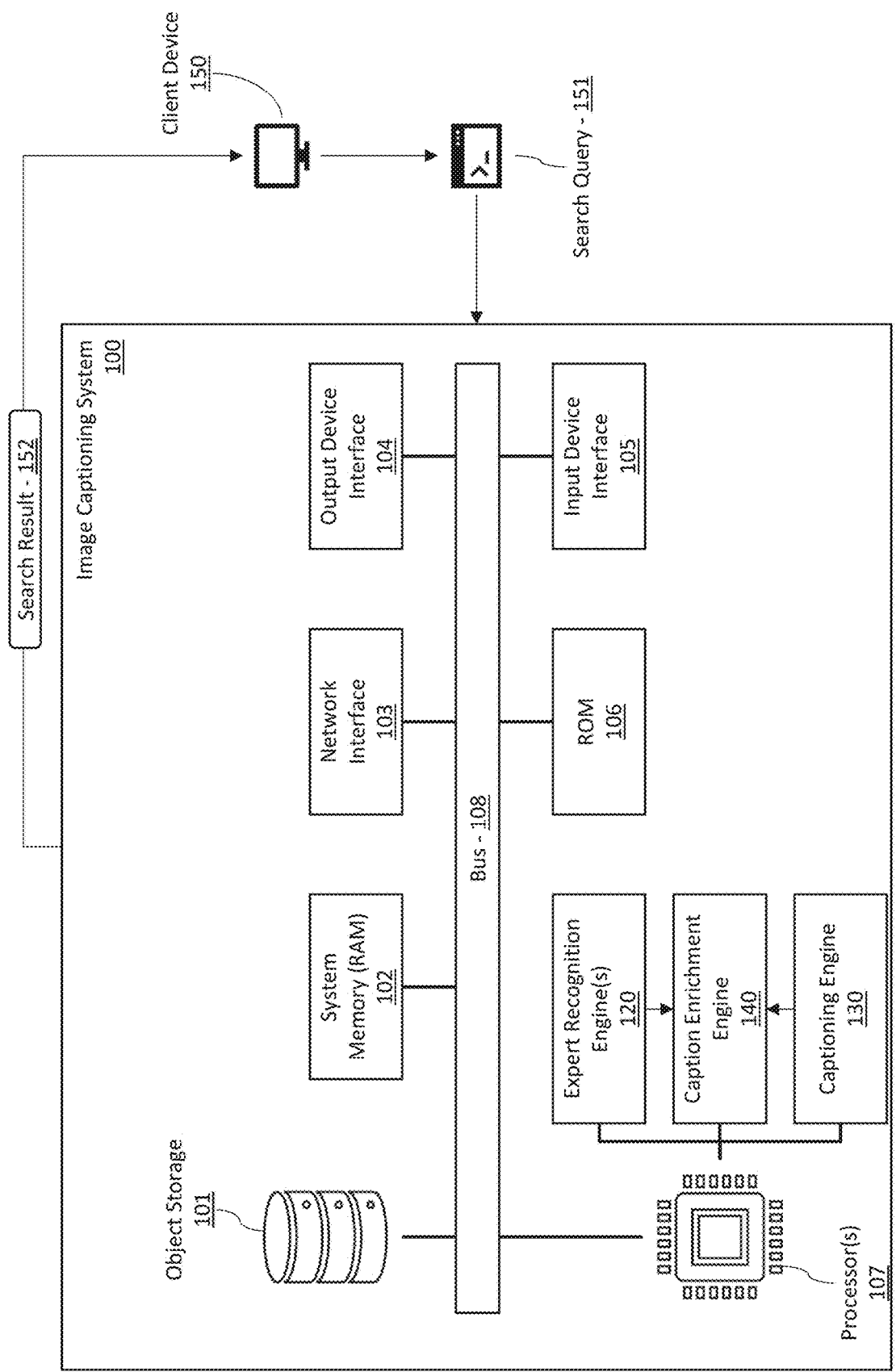
FIG. 1 depicts an image captioning system 100 for processing video and/or images to generate enhanced video features that accelerate video segment and/or set of one or more images searching in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "According to aspects of one or more embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of improving artificial intelligence (AI) and machine learning (ML) based image captioning via explainable AI and expert models. The following embodiments provide technical solutions and technical improvements that overcome technical problems, drawbacks and/or deficiencies in the technical fields involving machine learning detection, recognition and/or classification where model efficiency and generalizability typically come at the cost of precision, thus resulting in inefficient systems for AI/ML based captioning of images that lack precision or lack the ability to generalize across contexts. As explained in more detail, below, technical solutions and technical improvements herein include aspects of improved enrichment of generalized inferencing over images where explainable AI is leveraged to merge precising labelling of expert systems into a generalized caption technologies for improved AI/ML based inferencing over imagery. Such improvements to AI/ML based captioning result in improved image indexing using the improved captions for efficient image/video searching. Based on such technical features, further technical benefits become available to users and operators of these systems and methods. Moreover, various practical applications of the disclosed technology are also described, which provide further practical benefits to users and operators that are also new and useful improvements in the art.

Referring to FIG. 1, an image captioning system 100 for processing video and/or images to generate enhanced video features that accelerate video segment and/or set of one or more images searching is depicted in accordance with one or more embodiments of the present disclosure.

According to aspects of one or more embodiments, the image captioning system 100 may include hardware components such as a processor 116, which may include local or remote processing components. According to aspects of one or more embodiments, the processor 116 may include any type of data processing capacity, such as a hardware logic circuit, for example an application specific integrated circuit (ASIC) and a programmable logic, or such as a computing device, for example, a microcomputer or microcontroller that include a programmable microprocessor. According to aspects of one or more embodiments, the processor 116 may include data-processing capacity provided by the microprocessor. According to aspects of one or more embodiments, the microprocessor may include memory, processing, interface resources, controllers, and counters. According to aspects of one or more embodiments, the microprocessor may also include one or more programs stored in memory. According to aspects of one or more embodiments, the image captioning system 100 may include hardware and software components including, e.g., user client device 150 hardware and software, cloud or server hardware and software, or a combination thereof.

Similarly, the image captioning system 100 may include object storage 114, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. According to aspects of one or more embodiments, the object storage 114 may include, e.g., a suitable non-transient computer readable medium such as, e.g., random access memory (RAM) 102, read only memory (ROM) 106, one or more buffers and/or caches, among other memory devices or any combination thereof.

According to aspects of one or more embodiments, the image captioning system 100 may implement computer engines, e.g., utilizing one or more computer platforms, containers and/or virtual machines, to instantiate and execute the feature pipelines of the captioning engine 130. According to aspects of one or more embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. According to aspects of one or more embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

According to aspects of one or more embodiments, each feature pipeline of the captioning engine 130 may include dedicated and/or shared software components, hardware components, or a combination thereof. For example, one or more feature pipelines may include a dedicated processor and storage. According to aspects of one or more embodiments, one or more feature pipelines may share hardware resources, including the processor 116 and object storage 114 of the image captioning system 100 via, e.g., a bus 108.

According to aspects of one or more embodiments, video files and/or video streams may be accessed and/or received by the image captioning system 100. The image captioning system 100 may then store and index the video streams and/or video files in the object storage 114 for searching. To do so, According to aspects of one or more embodiments, the image captioning system 100 may use the captioning engine 130 to generate, according to a video indexing storage schema, a semantic markup for each video segment and/or set of one or more images based on the AI pipeline outputs, and index, according to the video indexing storage schema, a searchable video segment and/or set of one or more images object storing the video segment and/or set of one or more images with the semantic markup in the object storage 114.

According to aspects of one or more embodiments, the image captioning system 100 may support almost any type of video formats. Such formats may include, e.g., simpler MP4 files, advanced MXF from the broadcast industry, complex MOV or TS, among others or any combination thereof. The video may be encoded and decoded using a codec, e.g., MPEG2, H264, H265, AV1, among others or any combination thereof.

According to aspects of one or more embodiments, the image captioning system 100 may operate on discrete image files, video files and/or video streams, e.g., live video streams. According to aspects of one or more embodiments, the format of the live streams can be, e.g., RTMP, RTSP, HLS, SRT among others or any combination thereof. According to aspects of one or more embodiments, the live streams may be received on a webserver (e.g., based on NGINX or other webserver or any combination thereof).

According to aspects of one or more embodiments, a live stream may be a stream of bytes that is written as a file on a local machine according to a naming format. For example, the naming format may include, e.g., the name of the device from the ground (e.g., the recording device) and a timestamp.

According to aspects of one or more embodiments, in parallel to writing the live stream to an object storage 101, another processing thread may be reading the file (which may be a growing file as the live stream is received and continuously stored), and packaging it into chunks, such as chunks in a video streaming format (e.g., HLS or other format or any combination thereof) that are sent to an object storage.

According to aspects of one or more embodiments, the object storage 101 stores video files and video streams. The object storage 101 may be accessed via, e.g., application programming interface (API), hypertext transport protocol (HTTP), or other communication protocol and/or interface or any combination thereof, such as, e.g., Common Object Request Broker Architecture (CORBA), an application programming interface (API) and/or application binary interface (ABI), among others or any combination thereof. According to aspects of one or more embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. According to aspects of one or more embodiments, CORBA may normalize the method-call semantics between application objects residing either in the same address-space (application) or in remote address-spaces (same host, or remote host on a network). According to aspects of one or more embodiments, the object storage may, therefore, be the final storage solution but also the storage used to perform any further processing.

According to aspects of one or more embodiments, the images, whether from discrete images and/or frames of a video, may be processed by a captioning engine 130, one or more expert recognition engine(s) 120 and a caption enrichment engine 140 that encrichs a caption by reconciling the expert recognition engine(s) 120 output with the captioning engine 130 output. As a result, the captioning engine 130 may be trained to produce an initial, generalized, caption that is description of the image(s). To introduce added precision without sacrificing performance in the generalizability of the captioning engine 130, the expert recognition engine(s) 120 may be trained to generate more precise labels than the captioning engine 130 for the image(s) and/or items represented within the image(s).

For example, an object detection model may be trained to recognize different species of animals, but may lose performance when identifying breeds within a species, thus favoring generalizability across species. In contrast, the same or different model may be trained to better recognize different breeds within a species, but doing so may sacrifice the accuracy in identifying other species, thus favoring precision over generalizability. Similarly, the captioning engine 130 may be trained to output labels that are generally descriptive of people represented in the image(s), that generalizability may introduce difficulty in achieve as much or more performance in precisely identifying the identities of the people.

Thus, According to aspects of one or more embodiments, the expert recognition engine(s) 120 may be trained for more precise recognition, detection and/or classification tasks that the captioning engine 130. The labels produced by the expert recognition engine(s) 120 may then be fused into the labels output by the captioning engine 130 by replacing, modifying or adding to the labels of the captioning engine 130. Thus, a final caption can be generated that benefits from the generalizability of the captioning engine 130 while also including the precise detections, recognitions and/or classifications of the expert recognition engine(s) 120.

According to aspects of one or more embodiments, the caption enrichment engine 140 may fuse the precise labels of the expert recognition engine(s) 120 into the generalized caption of the captioning engine 130. To do so, the caption enrichment engine 140 may use explainable AI techniques to reconstruct or identify attention in the captioning engine 130 model(s).

For example, the captioning engine 130 may utilize an image caption feature pipeline. According to aspects of one or more embodiments, the image caption feature pipeline may take as input a video segment and/or set of one or more images and output a summary feature including a vector matching a description of the picture based on image classification of one or more frames of the video segment and/or set of one or more images using one or more semantic recognition machine learning models. According to aspects of one or more embodiments, the image caption feature pipeline may take as input a video segment and/or set of one or more images and output a summary feature including a vector matching a description of the picture based on image classification of one or more frames of the video segment and/or set of one or more images using one or more semantic recognition machine learning models. Accordingly, one or more semantic recognition machine learning models may ingest an image or sequence of images and output one or more labels indicative of semantic concept(s) associated with the image or sequence of images. The image caption feature pipeline may use the label(s) to construct a description, e.g., in natural language via natural language generation, and/or metadata indicative of the semantic concepts associated with the image(s).

According to aspects of one or more embodiments, the captioning pipeline may take as an input a video segment and/or set of one or more images and output a vector matching a description of the picture to perform image captioning. According to aspects of one or more embodiments, the captioning pipeline may receive the message that a new video segment and/or set of one or more images is available. According to aspects of one or more embodiments, the image captioning pipeline may extract multiple frames (e.g., 2, 3, 4, 5, 6, 7, 8, 9, 10, etc.) at predetermined intervals (e.g., equally spaced relative to video segment and/or set of one or more images duration, at predefined locations, or other intervals or any combination thereof) throughout the video segment and/or set of one or more images, such as, e.g., three frames from the video segment and/or set of one or more images at 25%/50%/75% of the video segment and/or set of one or more images duration. According to aspects of one or more embodiments, the captioning pipeline may vectorize each frame using a video understanding model (such a BLIP) and compute an average vector. According to aspects of one or more embodiments, the vector may then be kept on a persistent storage for the next phase along with the video segment and/or set of one or more images type. Accordingly, one or more semantic recognition machine learning models may ingest an image or sequence of images and output one or more labels indicative of semantic concept(s) associated with the image or sequence of images.

It may not be evident what portions of the input image(s) drove the image caption feature pipeline to output each of the features. Thus, explainable AI techniques may be used to reconstruct the attention to identify the portion of the images that are most determinative for the image caption feature pipeline to produce each feature.

According to aspects of one or more embodiments, the explainable AI techniques may include one or more visual explanation algorithms. According to aspects of one or more embodiments, a visual explanation algorithm may include an algorithm configured to determine one or more gradients or other internal neural network state calculated to infer the features produced by the captioning engine 130. Examples of visual explanation algorithms may include, but are not limited to, e.g., Grad-CAM, Randomized Input Sampling for Explanation (RISE), or other visual explanation model or any combination thereof.

According to aspects of one or more embodiments, the visual explanation algorithm may include a visual transformer modified to determine the correspondence between an image and the features (e.g., words of the caption). The visual transformer may include an encoder and decoder where, under ordinary operation, would ingest an image at the encoder and output, via the decoder, one or more words associated with the image. According to aspects of one or more embodiments of the present disclosure, the encoder and the decoder are reversed such that the image and the word(s) are fed into the decoder and the encoder outputs the correspondence, e.g., the gradient(s) associated with the internal network state, that measures the importance of each pixel and/or region within the image to the word(s).

According to aspects of one or more embodiments, the visual explanation algorithm may calculate, based on the gradient(s) or other internal state(s) of the captioning engine 130 and generate a visual map for each image that indicates the relative importance of regions of each image to the generation of the inferred caption features. According to aspects of one or more embodiments, the map may be an attention map or importance map that identifies regions and/or pixels within each image.

According to aspects of one or more embodiments, based on the visual maps, the caption enrichment engine 150 may identify the regions within each image that are most important (e.g., contribute the most) to the generation of each feature. For example, the caption enrichment engine 150 may impose a threshold including a threshold importance value associated with a measure of importance sufficient to identity the pixel/region as associated with the feature, a threshold importance percentage value associated with a percentile associated with the most important pixels/regions for the feature, or other predetermined threshold value. As a result, the caption enrichment engine 150 may identify in each image the pixel(s) and/or region(s) associated with each feature produced by the captioning engine 130.

According to aspects of one or more embodiments, the caption enrichment engine 150 may identify one or more features of the caption as candidates for enrichment. According to aspects of one or more embodiments, the caption enrichment engine 150 may include an index of terms that are mapped to one or more precise recognition tasks. For example, a caption feature including the word "man," "woman," "person," "people," or other term related to a person or people may be mapped to a facial recognition task. Additional rules for candidate features may implemented. For example, one or more rules may include:
  a. "a <candidate word>" may be enriched with "<person name>"
  b. "another <candidate word>" may be enriched with "<person name>"
  c. "two [persons, people]" may be enriched with "<person name1> and <person name2>
  d. "three [persons, people]" may be enriched with "<person name1> and <person name2> and <person name3>
  e. "<person name>" (detected in the caption by a Named Entity Recognition module) may be enriched with "<verified person name>"

According to aspects of one or more embodiments, the caption enrichment engine 150 may compare the candidate feature(s) to the output of the expert recognition engine(s) 120. The output of the expert recognition engine(s) 120 may include, as detailed above, a precise label that more specifically identifies a person, place, thing, semantic concept, group, or other item in the image. The output may also include a bounding box for each precise label indicative of the region being labeled as the item.

To enrich the caption features of the image(s), the caption enrichment engine 150 may match the output of the expert recognition engine(s) 120 to the candidate features mapped to the associated recognition task. Where the bounding box of the output matches the pixel(s)/region(s) of importance for the candidate feature(s), e.g., according to a spatial alignment within the image(s), the caption enrichment engine 150 may determine that the precise label is associated with the candidate feature. As a result, the caption enrichment engine 150 may replace and/or modify the candidate feature of the caption with the precise label, thus adding more precision to the caption without sacrificing the generalizability of the captioning engine 130.

For example, When the caption enrichment engine 150 may calculate an overlapping ratio of the bounding box with the attention region(s) on the image(s). Where the overlapping ratio is above a predetermined overlap threshold, the name is may be automatically inserted into the caption to enrich the caption. The predetermined overlap threshold may include a ratio of, e.g., 0.2, 0.1, 0.05, or other ratio optimized to obtain the best results on a specific image library.

According to aspects of one or more embodiments, the expert recognition engine(s) 120 may include one or more AI and/or ML based feature pipelines tailored for various ML/AI tasks based on training with precise identifications relative to the expert recognition engine(s) 120. According to aspects of one or more embodiments, multiple AI and/or ML based feature pipelines may be trained to generate ML model-specific features for each image, set of images, and/or video, where each set of images may include a subset of images and/or frames grouped according to scene, video segment and/or set of one or more images, temporal proximity, or other grouping methodology. For example, the expert recognition engine(s) 120 may include a video segment and/or set of one or more images clustering pipeline to cluster a subset of chunks and/or frames into a video segment and/or set of one or more images associated with a particular video segment and/or set of one or more images, and classify the video segment and/or set of one or more images according to type.

According to aspects of one or more embodiments, to generate the features, the expert recognition engine(s) 120 may include one or more AI/ML pipelines for, e.g., face detection, pattern recognition, text recognition, semantic classification, object recognition, among other classification, detection and/or recognition tasks or any combination thereof.

According to aspects of one or more embodiments, the expert recognition engine(s) 120 may include a face detection feature pipeline to produce the face detection features, e.g., labels identifying at least one identifying features of at least one detection face, such as a name, gender, age, attire, among others or any combination thereof. According to aspects of one or more embodiments, the face detection feature pipeline may be trained on a dataset of specific individuals, such as celebrities, athletes, politicians, criminals, or any other one or more sets of individuals that of interest to an application of the image captioning system 100.

For example, According to aspects of one or more embodiments, the face detection feature pipeline may process one or more frames of each video segment and/or set of one or more images to recognize, using one or more machine learning models, faces of persons appearing in a given video segment and/or set of one or more images. For example, the face detection feature pipeline may process up to, e.g., 3 frames of each video segment and/or set of one or more images, or up to 1, 2, 3, 4, 5, 6, 7, 8, 9, or more frames per video segment and/or set of one or more images. According to aspects of one or more embodiments, the one or more frames may be selected based on location within the video segment and/or set of one or more images, such as, e.g., first, last, middle, or a predetermined percentage of the duration of the video segment and/or set of one or more images, or any combination thereof. According to aspects of one or more embodiments, each detected face may then be recognized as a particular person using one or more face recognition machine learning models. As a result, the face detection feature pipeline may output the identifying information of each person appearing in the imagery.

According to aspects of one or more embodiments, the goal of the face recognition pipeline may be to take a video segment and/or set of one or more images as an input and apply face detection to output an array of detected persons with their associated given confidence. Accordingly, the face recognition pipeline may use the chunk-based video format and extract frames between each timecode. According to aspects of one or more embodiments, some or all frames may be either written locally or stored in memory depending on the size of the video segment and/or set of one or more images to minimize processing time.

According to aspects of one or more embodiments, the face recognition pipeline may, on each frame, use a deep learning-based object detection model that can detect faces (such as the implementation RetinaNet). Each face may be stored in array of bounding boxes. According to aspects of one or more embodiments, these bounding boxes may then be tracked on each picture to track a particular face across frames for face tracking and reconcile the number of unique people in the scene.

According to aspects of one or more embodiments, by tracking the bounding box of a face, the face recognition pipeline may choose the best picture (based on, e.g., brightness, sharpness, size and confidence of detection). According to aspects of one or more embodiments, the face recognition pipeline may isolate face vectors for this feature and compare these vectors against a graph database (e.g., using a k-Nearest Neighbors approach) and compute the nearest vectors for person identification 2040. The nearest vector(s) may provide the name of the person and/or an identifier (e.g., an internal database ID, a Wikidata ID, or other identifier or any combination thereof). According to aspects of one or more embodiments, the identifiers may facilitate disambiguating someone that would have the same name.

According to aspects of one or more embodiments, once the face recognition pipeline generates all results, the face recognition pipeline may keep each detected person and the associated confidence on a persistent storage, and generate an event. According to aspects of one or more embodiments, results can be seen in the web browser and the module is starting with another video segment and/or set of one or more images.

According to aspects of one or more embodiments, the expert recognition engine(s) 120 may include a pattern feature pipeline. According to aspects of one or more embodiments, the pattern feature pipeline may process one or more images to identify, using one or more image recognition machine learning models, particular custom patterns, such as, e.g., logos, signs, trademarks, etc. According to aspects of one or more embodiments, the pattern feature pipeline may be trained on a dataset of specific patterns, such as company logos, branding imagery, road signs, or any other one or more sets of patterns that of interest to an application of the image captioning system 100.

For example, the pattern feature pipeline may process up to, e.g., 3 frames of each video segment and/or set of one or more images, or up to 1, 2, 3, 4, 5, 6, 7, 8, 9, or more frames per video segment and/or set of one or more images. According to aspects of one or more embodiments, the one or more images may be selected based on location within the video segment and/or set of one or more images, such as, e.g., first, last, middle, or a predetermined percentage of the duration of the video segment and/or set of one or more images, or any combination thereof. Thus, the pattern feature pipeline may output identifying information of one or more custom patterns features identifying custom patterns appearing in the imagery.

According to aspects of one or more embodiments, the custom pattern recognition pipeline may be used to detect custom patterns (brand logos, signs, traffic signals, trademarks, etc.) on video. The custom pattern recognition pipeline may receive the message that a new video segment and/or set of one or more images is available. The custom pattern recognition pipeline may extract all frames from the chunk pivot format. The custom pattern recognition pipeline may detect all custom patterns in the dedicated customer dataset (The custom pattern recognition pipeline may be trained on a dedicated custom pattern dataset for each customer, with an assigned identifier and/or Wikidata identifier to ensure semantic reconciliation) on the frames. According to aspects of one or more embodiments, the custom pattern recognition pipeline may be configured as a lightweight processing pipeline where detection and recognition are separated. A detection analysis may be performed first, if no custom pattern is detected, then no recognition processing is initiated, thus saving time, processing resources, energy, etc. According to aspects of one or more embodiments, each occurrence is then saved and kept in a persistent storage for further usage (index in the search engine, notification, media logging)

According to aspects of one or more embodiments, the expert recognition engine(s) 120 may include a text recognition feature pipeline. According to aspects of one or more embodiments, the text recognition feature pipeline may use one or more optical character recognition and/or natural language processing/recognition machine learning models to ingest one or more images and output text features representing the text in one or more frames of the video segment and/or set of one or more images. For example, the text recognition feature pipeline may construct a character string matching the text identified by the optical character recognition and/or natural language processing/recognition machine learning models.

According to aspects of one or more embodiments, the text recognition pipeline may detect text in frames of the video to facilitate various processes and to make the video segment and/or set of one or more images searchable. To do so, According to aspects of one or more embodiments, the text recognition pipeline 104 may employ text recognition, e.g., using optical character recognition (OCR). According to aspects of one or more embodiments, however, the text recognition pipeline may face several challenges, such as, e.g., variety of fonts and alphabets, and having to perform OCR over video, where text can move and be partially visible. According to aspects of one or more embodiments, the text recognition pipeline may be configured as a lightweight processing pipeline where detection and recognition are separated. A detection analysis may be performed first, if no text or recognizable object (person, logo, etc.) is detected, then no recognition processing is initiated, thus saving time, processing resources, energy, etc.

According to aspects of one or more embodiments, to address the challenges, the text recognition pipeline may employ OCR over video. To do so, the text recognition pipeline may receive the message that a new video segment and/or set of one or more images is available, and extract all frames from the chunk pivot format. According to aspects of one or more embodiments, the text recognition pipeline may extract text on each frame, and reconcile the extracted text. According to aspects of one or more embodiments, the reconciliation may be done by calculating the similarity of all the extracted text, every second, without taking into account the bounding boxes. This allows for groups, where, for each group, the text recognition pipeline may keep the text with the greatest confidence within the group. According to aspects of one or more embodiments, the text recognition pipeline may clean the text using an NLP pass. According to aspects of one or more embodiments, the OCR may be based on Easy OCR that is supporting Latin and Arabic characters. According to aspects of one or more embodiments, at the end of the video segment and/or set of one or more images, the text recognition pipeline are keeping results on a persistent storage with detected text and their associated timecodes.

According to aspects of one or more embodiments, for recognition of text in larger blocks of text, the block can be identified and recognized via dynamic zoning and paragraph clustering. Dynamic zoning may dynamically identify text located in specific areas(zones) on a document or an image to extract zonally. Thus, dynamic zoning may identify groupings of text in detected areas within the image, and extract the text corresponding to the area.

Paragraph clustering may cluster recognized text into the paragraphs in which they belong, e.g., where text appears in a paragraph form, the paragraph clustering may assess the text and maintain the paragraph structure. To do so, the paragraph cluster may make use of word embeddings for the detected text and determine similarity, thus grouping text into a paragraph based on the word embeddings, e.g., based on semantic similarity, agglomerative clustering, Brown clustering, etc. Alternatively or in addition, multiple paragraphs may be clustered by vectoring each paragraph and grouping paragraphs based on, e.g., similarity of the vectors.

According to aspects of one or more embodiments, the feature(s) output by the expert recognition engine(s) 120 may be stored in the object storage 101 or other data store. According to aspects of one or more embodiments, the object store 101 may include, e.g., a suitable memory or storage solutions for maintaining electronic data representing the activity histories for each account. For example, the data store may include database technology such as, e.g., a centralized or distributed database, cloud storage platform, decentralized system, server or server system, among other storage systems. According to aspects of one or more embodiments, the data store may, additionally or alternatively, include one or more data storage devices such as, e.g., a hard drive, solid-state drive, flash drive, or other suitable storage device. According to aspects of one or more embodiments, the data store may, additionally or alternatively, include one or more temporary storage devices such as, e.g., a random-access memory, cache, buffer, or other suitable memory device, or any other data store and combinations thereof.

According to aspects of one or more embodiments, the expert recognition engine(s) 120 and/or one or more feature pipelines and/or engines thereof may be configured to utilize one or more exemplary AI/machine learning techniques chosen from, but not limited to, decision trees, boosting, support-vector machines, neural networks, nearest neighbor algorithms, Naive Bayes, bagging, random forests, and the like. According to aspects of one or more embodiments and, optionally, in combination of any embodiment described above or below, an exemplary neutral network technique may be one of, without limitation, feedforward neural network, radial basis function network, recurrent neural network, convolutional network (e.g., U-net) or other suitable network. According to aspects of one or more embodiments and, optionally, in combination of any embodiment described above or below, an exemplary implementation of Neural Network may be executed as follows:
   f. define Neural Network architecture/model,
   g. transfer the input data to the exemplary neural network model,
   h. train the exemplary model incrementally,
   i. determine the accuracy for a specific number of timesteps,
   j. apply the exemplary trained model to process the newly-received input data,
   k. optionally and in parallel, continue to train the exemplary trained model with a predetermined periodicity.

According to aspects of one or more embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. According to aspects of one or more embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. According to aspects of one or more embodiments and, optionally, in combination of any embodiment described above or below, the exemplary aggregation function may be a mathematical function that combines (e.g., sum, product, etc.) input signals to the node. According to aspects of one or more embodiments and, optionally, in combination of any embodiment described above or below, an output of the exemplary aggregation function may be used as input to the exemplary activation function. According to aspects of one or more embodiments and, optionally, in combination of any embodiment described above or below, the bias may be a constant value or function that may be used by the aggregation function and/or the activation function to make the node more or less likely to be activated.

According to aspects of one or more embodiments, parameters of the AI/ML model(s) of the expert recognition engine 120 may be trained based on known outputs. For example, the image(s) and/or segment(s) of video may be paired with a target classification or known classification to form a training pair, such as a historical image(s) and/or segment(s) of video and an observed result and/or human annotated classification denoting whether the historical image(s) and/or segment(s) of video is precise label(s). According to aspects of one or more embodiments, the image(s) and/or segment(s) of video may be provided to the AI/ML model(s) of the expert recognition engine 120, e.g., encoded in a feature vector, to produce a predicted label. According to aspects of one or more embodiments, an optimization function associated with the AI/ML model(s) of the expert recognition engine 120 may then compare the predicted label with the known output of a training pair including the historical image(s) and/or segment(s) of video to determine an error of the predicted label. According to aspects of one or more embodiments, the optimization function may employ a loss function, such as, e.g., Hinge Loss, Multi-class SVM Loss, Cross Entropy Loss, Negative Log Likelihood, or other suitable classification loss function to determine the error of the predicted label based on the known output.

According to aspects of one or more embodiments, the known output may be obtained after the AI/ML model(s) of the expert recognition engine 120 produces the prediction, such as in online learning scenarios. In such a scenario, the AI/ML model(s) of the expert recognition engine 120 may receive the image(s) and/or segment(s) of video and generate the model output vector to produce a label classifying the image(s) and/or segment(s) of video. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the image(s) and/or segment(s) of video to form the training pair and the optimization function may determine an error of the predicted label using the feedback.

According to aspects of one or more embodiments, based on the error, the optimization function may update the parameters of the AI/ML model(s) of the expert recognition engine 120 using a suitable training algorithm such as, e.g., backpropagation for a classifier machine learning model. According to aspects of one or more embodiments, backpropagation may include any suitable minimization algorithm such as a gradient method of the loss function with respect to the weights of the classifier machine learning model. Examples of suitable gradient methods include, e.g., stochastic gradient descent, batch gradient descent, minibatch gradient descent, or other suitable gradient descent technique. As a result, the optimization function may update the parameters of the AI/ML model(s) of the expert recognition engine 120 based on the error of predicted labels in order to train the AI/ML model(s) of the expert recognition engine 120 to model the correlation between image(s) and/or segment(s) of video and precise label(s) in order to produce more accurate labels of image(s) and/or segment(s) of video.

According to aspects of one or more embodiments, one or more machine learning models and/or algorithms detailed above may be fine-tuned with specialized knowledge. For example, one or more models may be implemented that are specially trained for topics such as golf, football, news, politics, movies, television, science(s), among others or any combination thereof.

According to aspects of one or more embodiments, the caption enrichment engine 140 may store the enriched caption(s) in an object storage 114 in associated with a respective video segment and/or set of one or more images of a live stream and/or stored video. According to aspects of one or more embodiments, a user at a client device 150 may employ a search engine to search the object storage 114 in response to a search query 151 to access one or more video segment and/or set of one or more images. Upon receiving the search query 151, the image captioning system 100 may query the object storage 101 for one or more enriched caption(s) matching the search query 151 and, upon identifying a match, return a search result 152 to the client device 150, the search result 152 including the video segment, video and/or image(s) associated with the matched enriched caption(s).

According to aspects of one or more embodiments, the search query 151 may include, e.g., text, keywords, image(s), audio, etc. According to aspects of one or more embodiments, the search engine may compare the search query 152 to the enriched caption(s) for each video segment and/or set of one or more images in the object store 101. Thus, the search engine may identify a matching video segment and/or set of one or more images within a video and/or live video stream that matches the user's search query 151 based on people, custom patterns, audio content, image content, and/or data entries.

According to aspects of one or more embodiments, the client device 150 may interact with the image captioning system 100 using one or more suitable local and/or network interfaces, including network interface 103, output device interface 104, input device interface 105, or other hardware and/or software interface enabling direct and/or networked communication between the client device 150 and the image captioning system 100. According to aspects of one or more embodiments, the one or more interfaces may include one or more software and/or hardware interface technologies. For example, According to aspects of one or more embodiments, one or more interfaces may utilize one or more hardware computing interface technologies, such as, e.g., Universal Serial Bus (USB), IEEE 1394 (FireWire), Ethernet, Thunderbolt™, Serial ATA (SATA) (including eSATA, SATAe, SATAp, etc.), among others or any suitable combination thereof.

According to aspects of one or more embodiments, one or more interfaces may utilize one or more software computing interface technologies, such as, e.g., Common Object Request Broker Architecture (CORBA), an application programming interface (API) and/or application binary interface (ABI), among others or any combination thereof. According to aspects of one or more embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. According to aspects of one or more embodiments, CORBA may normalize the method-call semantics between application objects residing either in the same address-space (application) or in remote address-spaces (same host, or remote host on a network).

For example, the client device 150 may interact with the image captioning system 100 over a network including the Internet using the HyperText Transport Protocol (HTTP) to communicate one or more API requests to cause the image captioning system 100 to use a search engine to search video segment and/or set of one or more imagess according to the features output by the captioning engine 130. In another example, the image captioning system 100 is connected to the client device 150 via a network, e.g., using the network interface 111. For example, the network may be a local network, such as, e.g., Ethernet, Local Area Network (LAN), wireless LAN (WLAN), WiFi, Bluetooth, or other suitable networking technology or any combination thereof, and communicate via API requests and/or database queries in a suitable database query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages). According to aspects of one or more embodiments, any suitable combination of local, networked, cloud, distributed or other computing architecture may be employed to return the search results in response to the search query 151 for display via the client device 150 on the client device 150.

According to aspects of one or more embodiments, the network may include any suitable computer network, including, two or more computers that are connected with one another for the purpose of communicating data electronically. According to aspects of one or more embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. According to aspects of one or more embodiments, a LAN may connect computers and peripheral devices in a physical area by means of links (wires, Ethernet cables, fiber optics, wireless such as Wi-Fi, etc.) that transmit data. According to aspects of one or more embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. According to aspects of one or more embodiments, a WAN may connect computers and smaller networks to larger networks over greater geographic areas. A WAN may link the computers by means of cables, optical fibers, or satellites, cellular data networks, or other wide-area connection means. According to aspects of one or more embodiments, an example of a WAN may include the Internet.

Figure 2:
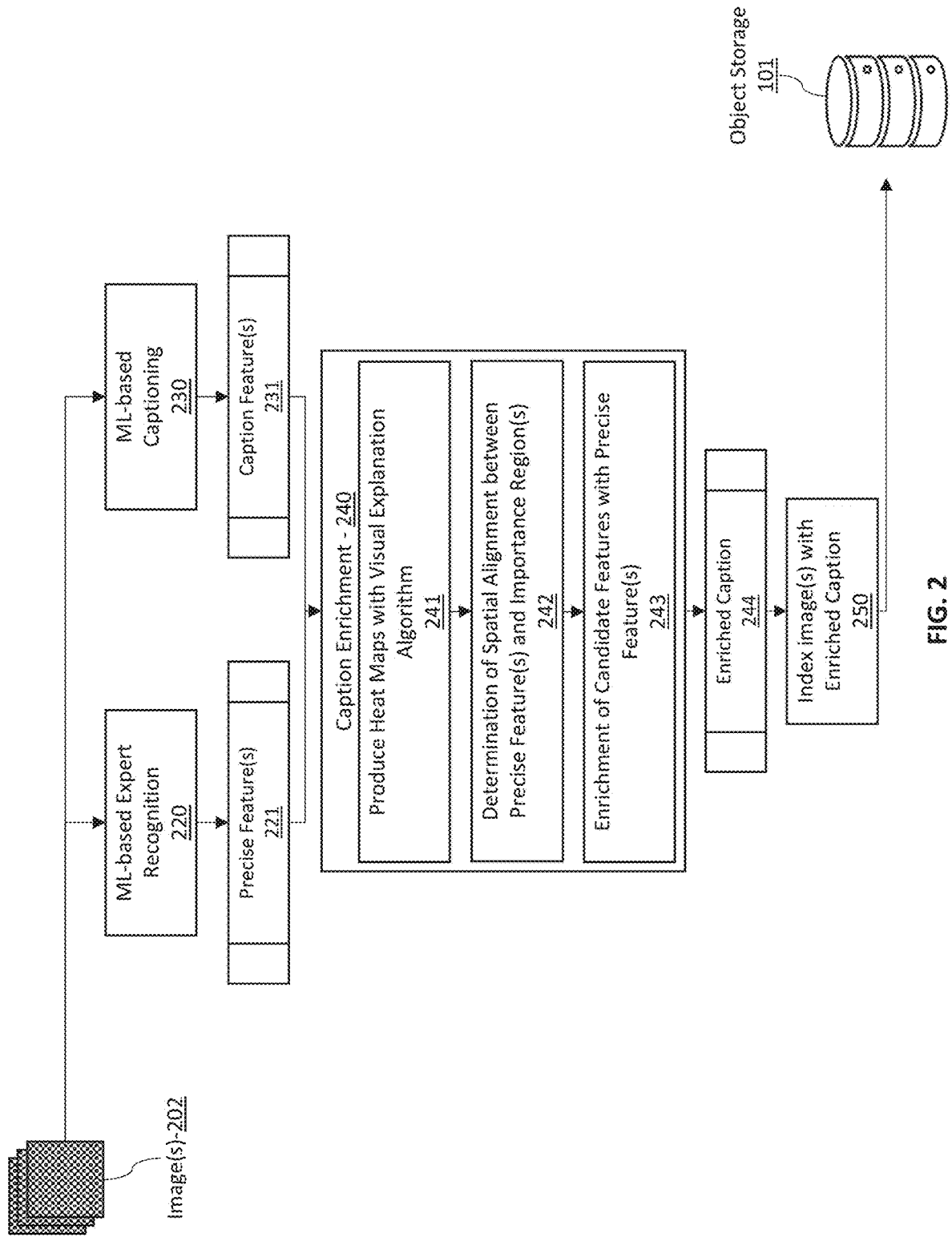
FIG. 2 depicts a flowchart for caption enrichment using multiple AI modalities in accordance with aspects of one or more embodiments of the present disclosure.

Referring now to FIG. 2, a flowchart for caption enrichment using multiple AI modalities is depicted in accordance with aspects of one or more embodiments of the present disclosure.

According to aspects of one or more embodiments, at least one image 202 may be obtained by the image captioning system 100. For example, one or more images 202 may be uploaded as a video or image file, or streamed (e.g., via live stream). ML-based captioning 230 may be performed on the image(s) 202 to produce caption feature(s) 231. The caption feature(s) 231 may include a textual description of the image(s) 202 including one or more words descriptive of the image, including detected, recognized and/or classified people, places, things, concepts or other items, as well as actions being performed within the image. To do so, an AI-based captioning pipeline may be employed that implements one or more deep learning models, such as a neural network, large language model, generative artificial intelligence (e.g., a generative pre-trained transformer (GPT) or other transformer), or any combination thereof.

Such ML-based captioning 230 technologies may often result in overly generalized caption features and/or incorrect or biased descriptors/words. Accordingly, the image(s) 202 may also be processed by ML-based expert recognition 220 to generate precise feature(s) 221. Such ML-based recognition 220 may include one or more expert systems trained on specialized datasets to precisely identify people, places, things, concepts or other items. According to aspects of one or more embodiments, the precise feature(s) 221 may include an identification label and a bounding box for a portion of the image(s) 202 to which the identification label corresponds.

According to aspects of one or more embodiments, caption enrichment 240 may be performed on the caption feature(s) 231 to fuse in the precise feature(s) 221. To do so, the caption enrichment 240 may include producing, at 241, heat maps that indicate one or more pixel(s)/region(s) within the image(s) 202. According to aspects of one or more embodiments, the caption enrichment 240 may include inputting the at least one image(s) 202 and the caption feature(s) 231 into at least one vision transformer model to produce the heat maps. The heat map includes a representation of a degree of significance of at least one portion of the image(s) 202 to producing each word in the caption feature(s) 231 in the ML-based captioning 230. According to aspects of one or more embodiments, the vision transformer may include inputting the image(s) 202 and the caption feature(s) 231 into the decoder of a vision transformer to output, via the encoder of the vision transformer, at least one gradient indicative of the degrees of significance for each word. The heat maps may then be produced by applying a threshold value to the gradient to identify the portions of the greatest degree of significance for each caption feature(s) 231.

According to aspects of one or more embodiments, caption enrichment 240 may include determining, at 242, a spatial alignment within the image(s) 202 of the bounding box and the heat map to identify an overlapping portion at which both the identification label and a word of the caption feature(s) 231 are associated. According to aspects of one or more embodiments, the word may be determined to be a candidate feature that is mapped to the expert system/expert recognition, such as a word associated with a person being mapped to a facial recognition task for a facial recognition expert system. Where the word is not mapped to a spatially aligned identification label, the word may not be a candidate feature, and thus the identification label is not merged into the caption feature(s) 231 to enrich the word.

Upon determining the spatial alignment between a candidate feature and the identification label of a precise feature(s) 221, the caption enrichment 240 may include enriching, at 243, the candidate feature with the precise feature(s) 221, thus modifying the caption to include the identification label in place of or alongside the word(s) describing the associated item in the image(s) 202. Accordingly, the caption enrichment 240 may modify at least one textual description of an AI-generated caption to include an identification label of at least one item based on the spatial alignment within the image(s) so as to produce a modified AI-generated caption associated with the at least one item.

According to aspects of one or more embodiments, the resulting enriched caption 244 may then be used to index, at 250, the image(s) 202 in an object storage 101. In so doing, the image(s) 202 may be better captioned for improved search by a user.

Figure 3:
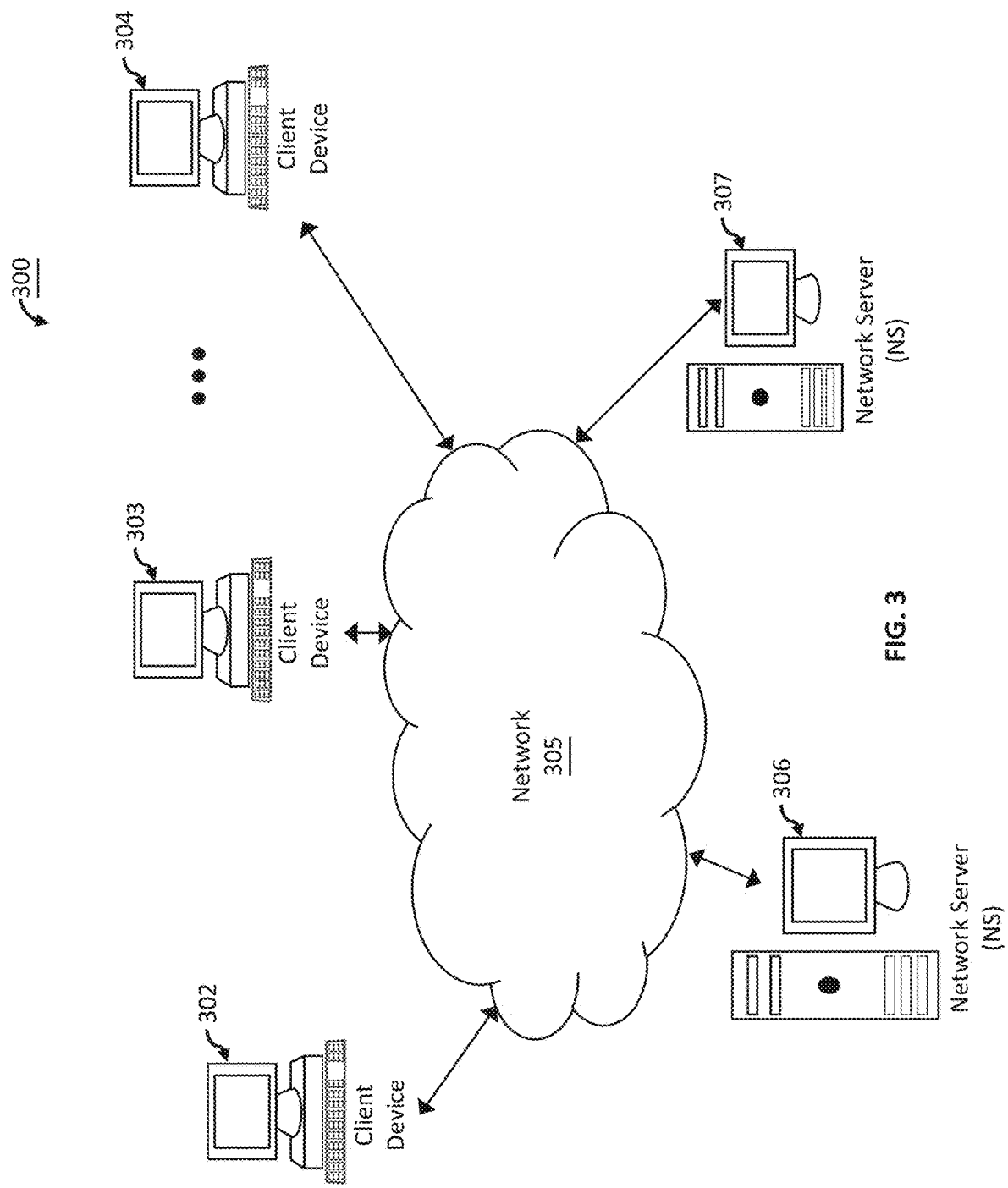
FIG. 3 depicts a block diagram of another exemplary computer-based system and platform for multi-modal image caption generation for enriched image captions in accordance with one or more embodiments of the present disclosure.

FIG. 3 depicts a block diagram of an exemplary computer-based system and platform 300 in accordance with one or more embodiments of the present disclosure. However, not all of these components may be required to practice one or more embodiments, and variations in the arrangement and type of the components may be made without departing from the spirit or scope of various embodiments of the present disclosure. According to aspects of one or more embodiments, the illustrative computing devices and the illustrative computing components of the exemplary computer-based system and platform 300 may be configured to manage a large number of members and concurrent transactions, as detailed herein. According to aspects of one or more embodiments, the exemplary computer-based system and platform 300 may be based on a scalable computer and network architecture that incorporates varies strategies for assessing the data, caching, searching, and/or database connection pooling. An example of the scalable architecture is an architecture that is capable of operating multiple servers.

According to aspects of one or more embodiments, referring to FIG. 3, client device 302, client device 303 through client device 304 (e.g., clients) of the exemplary computer-based system and platform 300 may include virtually any computing device capable of receiving and sending a message over a network (e.g., cloud network), such as network 305, to and from another computing device, such as servers 306 and 307, each other, and the like. According to aspects of one or more embodiments, the client devices 302 through 304 may be personal computers, multiprocessor systems, microprocessor-based or programmable consumer electronics, network PCs, and the like. According to aspects of one or more embodiments, one or more client devices within client devices 302 through 304 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. According to aspects of one or more embodiments, one or more client devices within client devices 302 through 304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). According to aspects of one or more embodiments, one or more client devices within client devices 302 through 304 may include may run one or more applications, such as Internet browsers, mobile applications, voice calls, video games, videoconferencing, and email, among others. According to aspects of one or more embodiments, one or more client devices within client devices 302 through 304 may be configured to receive and to send web pages, and the like. According to aspects of one or more embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. According to aspects of one or more embodiments, a client device within client devices 302 through 304 may be specifically programmed by either Java, .Net, QT, C, C++, Python, PHP and/or other suitable programming language. In some embodiment of the device software, device control may be distributed between multiple standalone applications. According to aspects of one or more embodiments, software components/applications can be updated and redeployed remotely as individual units or as a full software suite. According to aspects of one or more embodiments, a client device may periodically report status or send alerts over text or email. According to aspects of one or more embodiments, a client device may contain a data recorder which is remotely downloadable by the user using network protocols such as FTP, SSH, or other file transfer mechanisms. According to aspects of one or more embodiments, a client device may provide several levels of user interface, for example, advance user, standard user. According to aspects of one or more embodiments, one or more client devices within client devices 302 through 304 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

According to aspects of one or more embodiments, the exemplary network 305 may provide network access, data transport and/or other services to any computing device coupled to it. According to aspects of one or more embodiments, the exemplary network 305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. According to aspects of one or more embodiments, the exemplary network 305 may implement one or more of a GSM architecture, a General Packet Radio Service (GPRS) architecture, a Universal Mobile Telecommunications System (UMTS) architecture, and an evolution of UMTS referred to as Long Term Evolution (LTE). According to aspects of one or more embodiments, the exemplary network 305 may include and implement, as an alternative or in conjunction with one or more of the above, a WiMAX architecture defined by the WiMAX forum. According to aspects of one or more embodiments and, optionally, in combination of any embodiment described above or below, the exemplary network 305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. According to aspects of one or more embodiments and, optionally, in combination of any embodiment described above or below, at least one computer network communication over the exemplary network 305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. According to aspects of one or more embodiments, the exemplary network 305 may also include mass storage, such as network attached storage (NAS), a storage area network (SAN), a content delivery network (CDN) or other forms of computer or machine readable media.

According to aspects of one or more embodiments, the exemplary server 306 or the exemplary server 307 may be a web server (or a series of servers) running a network operating system, examples of which may include but are not limited to Apache on Linux or Microsoft IIS (Internet Information Services). According to aspects of one or more embodiments, the exemplary server 306 or the exemplary server 307 may be used for and/or provide cloud and/or network computing. Although not shown in FIG. 3, According to aspects of one or more embodiments, the exemplary server 306 or the exemplary server 307 may have connections to external systems like email, SMS messaging, text messaging, ad content providers, etc. Any of the features of the exemplary server 306 may be also implemented in the exemplary server 307 and vice versa.

According to aspects of one or more embodiments, one or more of the exemplary servers 306 and 307 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 301 through 304.

According to aspects of one or more embodiments and, optionally, in combination of any embodiment described above or below, for example, one or more exemplary computing client devices 302 through 304, the exemplary server 306, and/or the exemplary server 307 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 4:
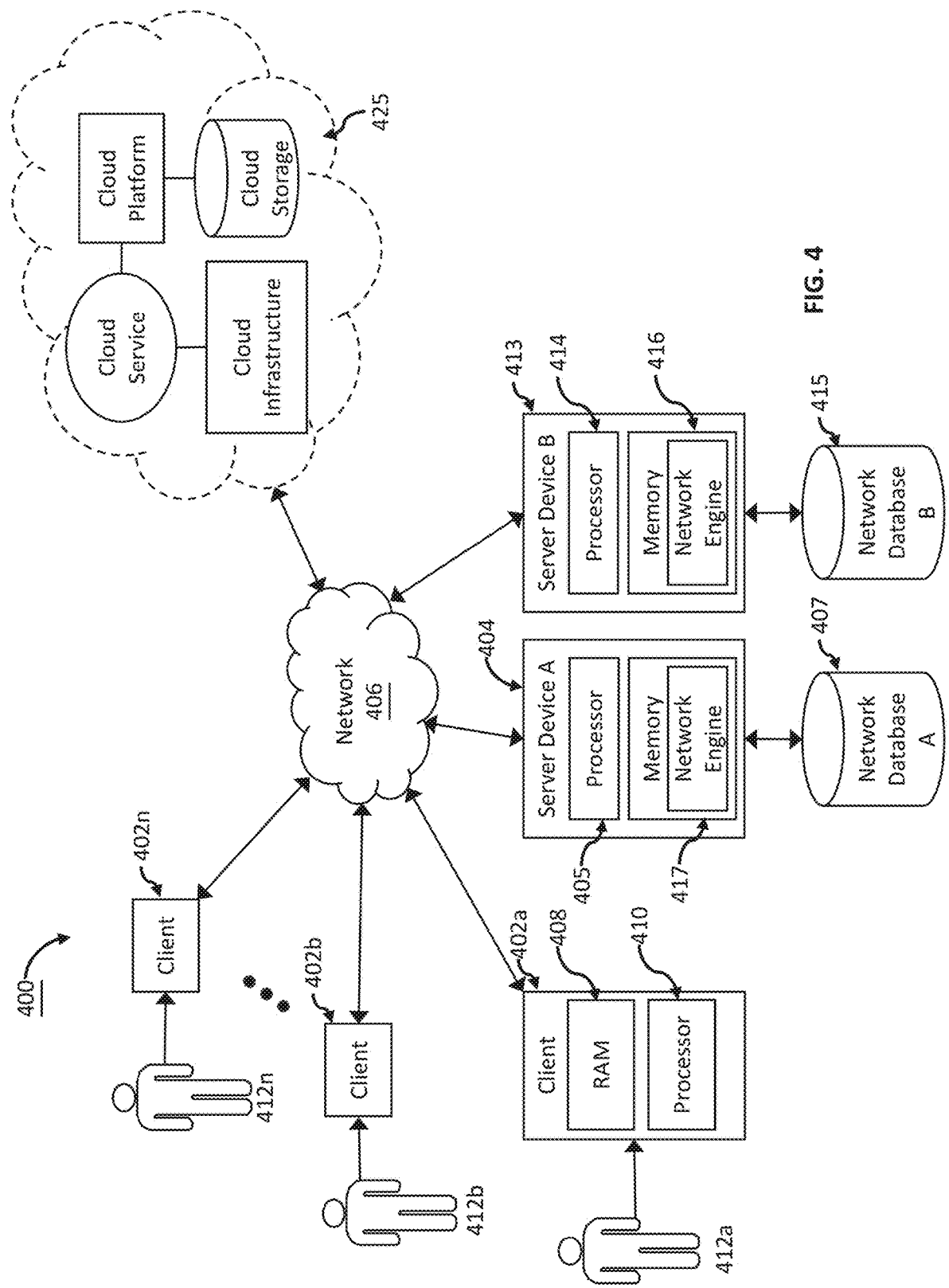
FIG. 4 depicts a block diagram of another exemplary computer-based system and platform for multi-modal image caption generation for enriched image captions in accordance with one or more embodiments of the present disclosure.

FIG. 4 depicts a block diagram of another exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. According to aspects of one or more embodiments, the client device 402a, client device 402b through client device 402n shown each at least includes a computer-readable medium, such as a random-access memory (RAM) 408 coupled to a processor 410 or FLASH memory. According to aspects of one or more embodiments, the processor 410 may execute computer-executable program instructions stored in memory 408.

According to aspects of one or more embodiments, the processor 410 may include a microprocessor, an ASIC, and/or a state machine. According to aspects of one or more embodiments, the processor 410 may include, or may be in communication with, media, for example computer-readable media, which stores instructions that, when executed by the processor 410, may cause the processor 410 to perform one or more steps described herein. According to aspects of one or more embodiments, examples of computer-readable media may include, but are not limited to, an electronic, optical, magnetic, or other storage or transmission device capable of providing a processor, such as the processor 410 of client device 402a, with computer-readable instructions. According to aspects of one or more embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. According to aspects of one or more embodiments, the instructions may comprise code from any computer-programming language, including, for example, C, C++, Visual Basic, Java, Python, Perl, JavaScript, and etc.

According to aspects of one or more embodiments, client devices 402a through 402n may also comprise a number of external or internal devices such as a mouse, a CD-ROM, DVD, a physical or virtual keyboard, a display, or other input or output devices. According to aspects of one or more embodiments, examples of client devices 402a through 402n (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. According to aspects of one or more embodiments, client devices 402a through 402n may be specifically programmed with one or more application programs in accordance with one or more principles/methodologies detailed herein. According to aspects of one or more embodiments, client devices 402a through 402n may operate on any operating system capable of supporting a browser or browser-enabled application, such as Microsoft™, Windows™, and/or Linux. According to aspects of one or more embodiments, client devices 402a through 402n shown may include, for example, personal computers executing a browser application program such as Microsoft Corporation's Internet Explorer™, Apple Computer, Inc.'s Safari™, Mozilla Firefox, and/or Opera. According to aspects of one or more embodiments, through the member computing client devices 402a through 402n, user 412a, user 412b through user 412n, may communicate over the exemplary network 406 with each other and/or with other systems and/or devices coupled to the network 406. As shown in FIG. 4, exemplary server devices 404 and 413 may include processor 405 and processor 414, respectively, as well as memory 417 and memory 416, respectively. According to aspects of one or more embodiments, the server devices 404 and 413 may be also coupled to the network 406. According to aspects of one or more embodiments, one or more client devices 402a through 402n may be mobile clients.

According to aspects of one or more embodiments, at least one database of exemplary databases 407 and 415 may be any type of database, including a database managed by a database management system (DBMS). According to aspects of one or more embodiments, an exemplary DBMS-managed database may be specifically programmed as an engine that controls organization, storage, management, and/or retrieval of data in the respective database. According to aspects of one or more embodiments, the exemplary DBMS-managed database may be specifically programmed to provide the ability to query, backup and replicate, enforce rules, provide security, compute, perform change and access logging, and/or automate optimization. According to aspects of one or more embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. According to aspects of one or more embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. According to aspects of one or more embodiments, the exemplary DBMS-managed database may be specifically programmed to include metadata about the data that is stored.

Figure 5:
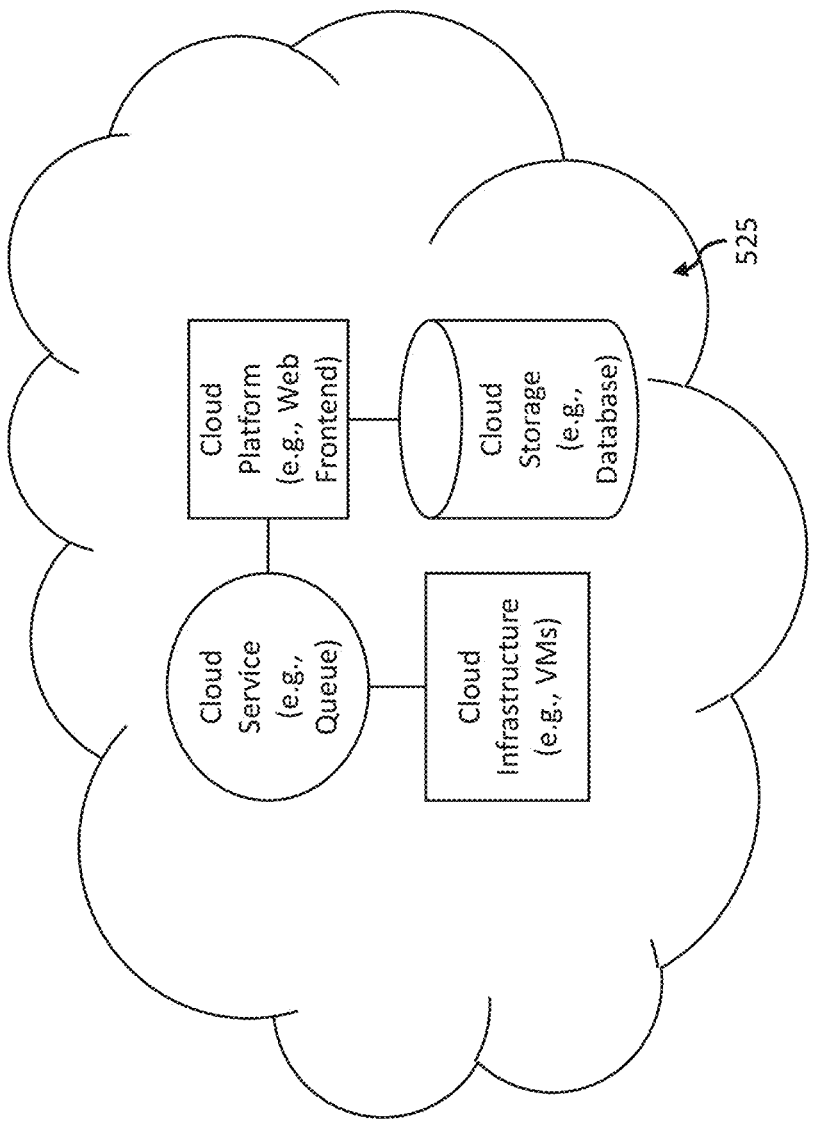
FIG. 5 depicts illustrative schematics of an exemplary implementation of the cloud computing/architecture(s) in which embodiments of a system for multi-modal image caption generation for enriched image captions may be specifically configured to operate in accordance with some embodiments of the present disclosure.
Figure 6:
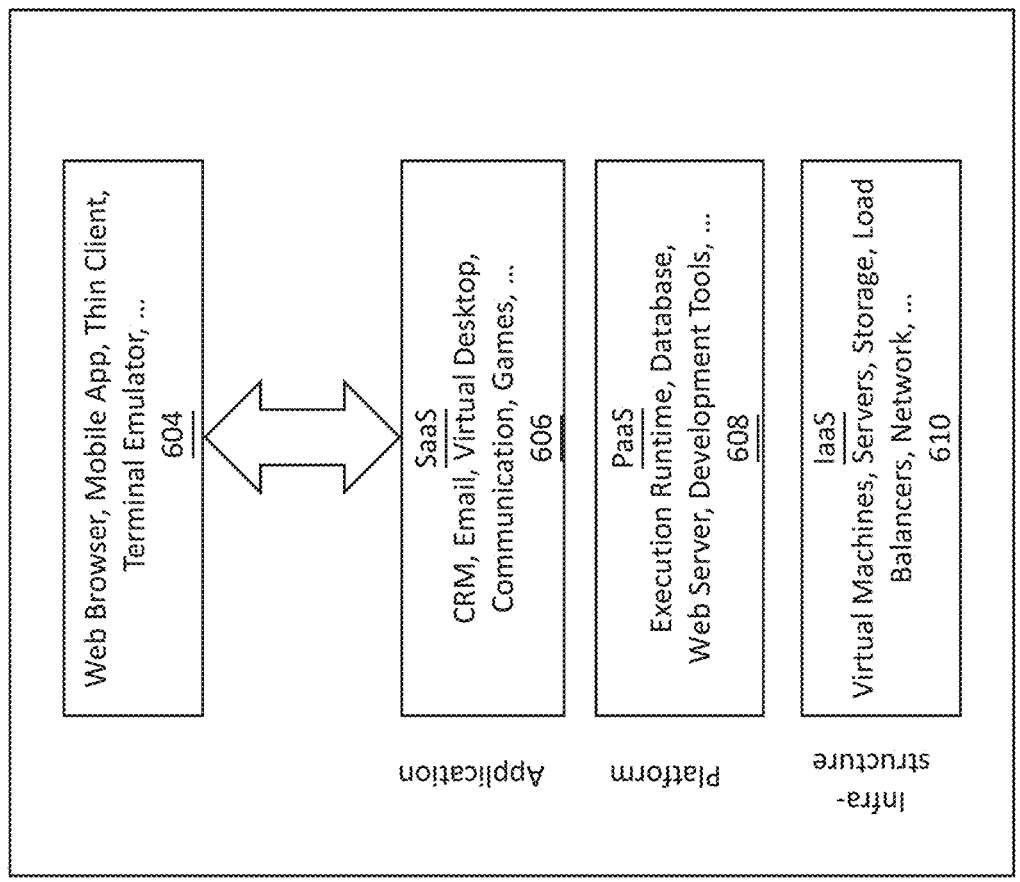
FIG. 6 depicts illustrative schematics of another exemplary implementation of the cloud computing/architecture(s) in which embodiments of a system for multi-modal image caption generation for enriched image captions may be specifically configured to operate in accordance with some embodiments of the present disclosure.

According to aspects of one or more embodiments, the exemplary inventive computer-based systems/platforms, the exemplary inventive computer-based devices, and/or the exemplary inventive computer-based components of the present disclosure may be specifically configured to operate in a cloud computing/architecture 425 such as, but not limiting to: infrastructure a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Figure 7:
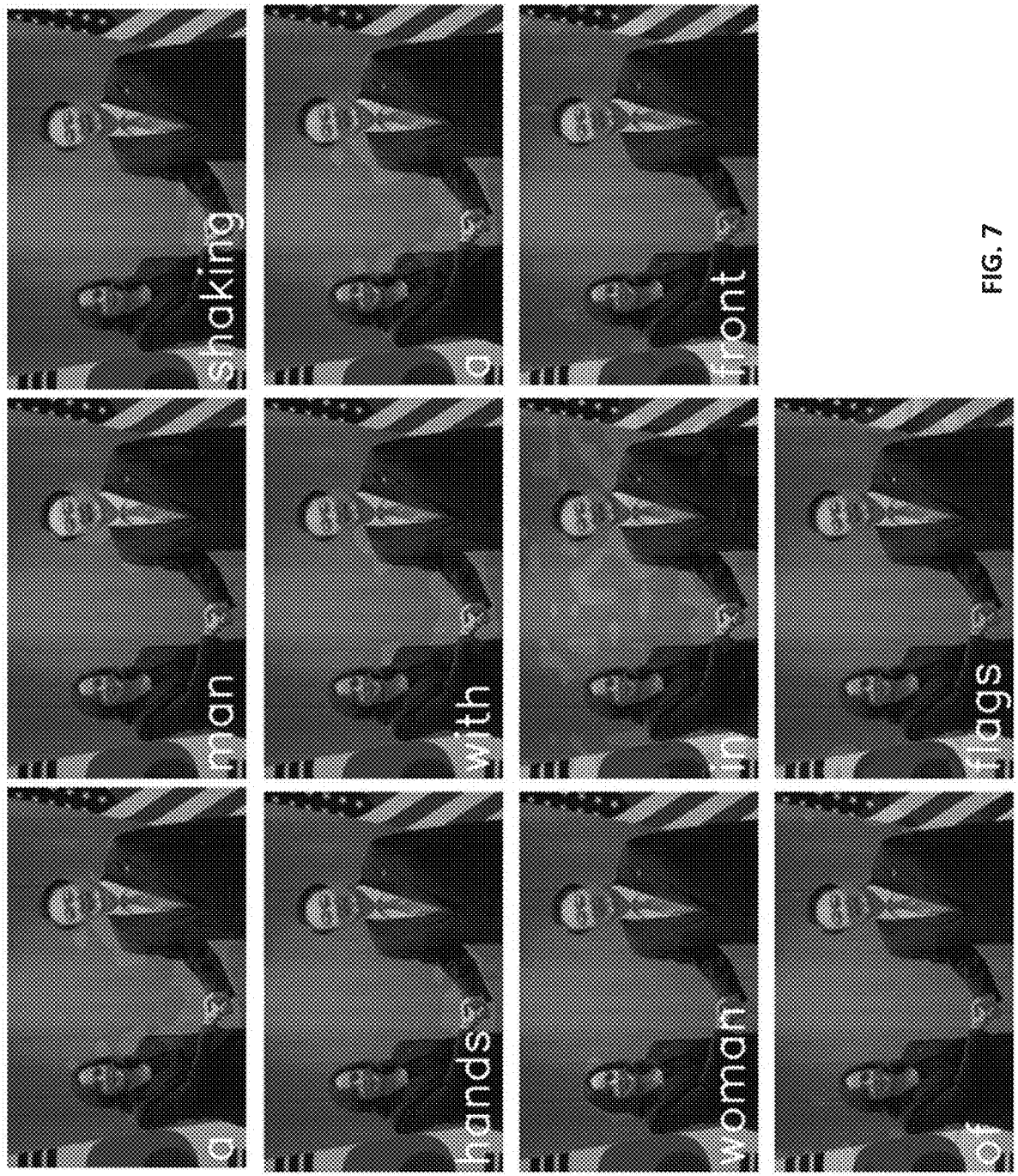
FIG. 7 depicts an example of attention maps generated on a set of images captioned via AI/ML-based captioning in accordance with some embodiments of the present disclosure.
Figure 8:
FIG. 8 depicts an example of an alignment between a precise label for face recognition where the bounding box of the precise label aligns an attention map in accordance with some embodiments of the present disclosure.

Referring now to FIGS. 7 and 8, an example of attention maps generated on a captioned via AI/ML-based captioning in order to enrich the caption based on an alignment between a bounding box for a precise label for face recognition and the attention map is illustrated in accordance with some embodiments of the present disclosure.

In this example, a sequence of images depicts a woman, Kamala Harris, shaking hands with a male diplomat. The captioning engine (e.g., captioning engine 130) produce a caption for this sequence including "a man shaking hands with a woman in front of flags." Upon application of the visual explanation algorithm to the caption and the sequence of images, the heat maps of FIG. 7 were produced that identified the region in the image that is most important to the generation of each word in the caption.

In parallel to the caption, a specialized algorithm ("expert system") for face detection and identification detects and identifies faces from a custom thesaurus of faces. The expert system identifies a face as Kamala Harris, with a bounding box representing the portion of the image identified as Kamala Harris.

Using the zones within the bounding box and comparing that to the zone associated with regions of importance of each heat map, an overlap is identified as the region of the image important to the generation of the word "woman." Based one or more rules/mappings, as detailed above, the identified face of Kamala Harris is fused into the caption to obtain the new caption of "a man shaking hands with Kamala Harris in front of flags."

Other examples and use cases may be implemented. Indeed, understanding accurately who is depicted in an image can improve search indices for images and video, especially in the context of broadcast and sport media. Aspects of embodiments of the present disclosure enhance this aspect including by reducing these biases and error while increasing precision. Examples for which expert systems may be trained, as detailed above, may include, e.g.:

1. Celebrity Recognition in Broadcast Media:
    i. Accurate Event Coverage: In live events, accurate identification of celebrities or public figures enables providing real-time, context-rich coverage. Aspects of embodiments of the described image captioning ensures that the correct names and details are associated with individuals, preventing misinformation or confusion.

m. Athlete Recognition in Sport Media:
  i. Player Highlights: Accurate identification of athletes in sports highlights is vital for creating compelling narratives and player-focused content. Aspects of embodiments of the image captioning technology facilitates in the generation of precise captions, ensuring that the right athletes are highlighted in key moments.
n. Mitigating Bias and Ensuring Fair Representation:
  i. Avoiding Misattribution: Accurate identification is essential in mitigating biases associated with misattribution. Aspects of embodiments of the image captioning technology reduces the likelihood of falsely associating individuals with events, preventing the spread of inaccurate information
  ii. Promoting Diversity: By accurately identifying individuals from diverse backgrounds, aspects of embodiments of the image captioning technology helps promote inclusivity and diversity in media representation, ensuring fair coverage and reducing the risk of perpetuating stereotypes.

Therefore, precise identification of individuals in images advances the technology of image captioning and search for providing accurate, engaging, and responsible media content. Aspects of embodiments of the image captioning technology not only enhances the overall viewer experience but also contributes to the credibility and fairness of media representation. The ability to control and correct automatic captions ensures that biases are minimized.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. According to aspects of one or more embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

According to aspects of one or more embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

According to aspects of one or more embodiments, the NFC can represent a short-range wireless communications technology in which NFC-enabled devices are "swiped," "bumped," "tap" or otherwise moved in close proximity to communicate. According to aspects of one or more embodiments, the NFC could include a set of short-range wireless technologies, typically requiring a distance of 10 cm or less. According to aspects of one or more embodiments, the NFC may operate at 13.56 MHz on ISO/IEC 18000-3 air interface and at rates ranging from 106 kbit/s to 424 kbit/s. According to aspects of one or more embodiments, the NFC can involve an initiator and a target; the initiator actively generates an RF field that can power a passive target. In some embodiment, this can enable NFC targets to take very simple form factors such as tags, stickers, key fobs, or cards that do not require batteries. According to aspects of one or more embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. According to aspects of one or more embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

According to aspects of one or more embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

According to aspects of one or more embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. According to aspects of one or more embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof.

According to aspects of one or more embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

According to aspects of one or more embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

According to aspects of one or more embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

According to aspects of one or more embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

According to aspects of one or more embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. According to aspects of one or more embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1: A method including:
o. obtaining, by at least one processor, at least one image;
p. obtaining, by the at least one processor, an artificial intelligence (AI)-generated caption including at least one textual description of the at least one frame of the at least one image;
q. where the at least one textual description includes at least one identification of at least one item in the at least one image;
r. inputting, by the at least one processor, the at least one image and the at least one textual description into at least one vision transformer model to produce at least one heat map for the at least one image;
s. where the at least one heat map includes a representation of a degree of significance of at least one portion of the at least one image to the at least one identification of the at least one item in the at least one textual description based at least in part on the at least one gradient;
t. inputting, by the at least one processor, the at least one image into an expert recognition machine learning model to output at least one bounding box including at least one label representative of the at least one item;
u. determining, by the at least one processor, for the at least one image, a spatial alignment within the at least one image between the at least one bounding box and the at least one portion of the at least one heat map; and
v. modifying, by the at least one processor, the at least one textual description of the AI-generated caption to include the at least one label of the at least one item based on the spatial alignment within the at least one image so as to produce a modified AI-generated caption associated with the at least one item.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
obtaining, by at least one processor, at least one image;
obtaining, by the at least one processor, an artificial intelligence (AI)-generated caption comprising at least one textual description of the at least one image;
wherein the at least one textual description comprises at least one identification of at least one item in the at least one image;
inputting, by the at least one processor, the at least one image and the at least one textual description into at least one vision transformer model to produce at least one heat map for the at least one image;
wherein the at least one heat map comprises a representation of a degree of significance of at least one portion of the at least one image to the at least one identification of the at least one item in the at least one textual description based at least in part on the at least one gradient;

inputting, by the at least one processor, the at least one image into an expert recognition machine learning model to output at least one bounding box comprising at least one label representative of the at least one item;

determining, by the at least one processor, for the at least one image, a spatial alignment within the at least one image between the at least one bounding box and the at least one portion of the at least one heat map; and modifying, by the at least one processor, the at least one textual description of the AI-generated caption to comprise the at least one label of the at least one item based on the spatial alignment within the at least one image so as to produce a modified AI-generated caption associated with the at least one item.

2. The method of claim 1, wherein the at least one vision transformer model comprises at least one encoder and at decoder; and wherein the at least one image is input into the decoder and output by the encoder to as to produce the at least one heat map.

3. The method of claim 1, wherein the expert recognition machine learning model comprises at least one face recognition machine learning model configured to output at least name associated with at least one face detected in the at least one image.

4. The method of claim 3, further comprising:

determining, by the at least one processor, at least one person in the at least one image based at least in part on at least one word of the at least one textual description being representative of the at least one person;

determining, by the at least one processor, that the at least one person and the at least one face match based at least in part on the spatial alignment; and modifying, by the at least one processor, the at least one textual description by replacing the at least one word associated with the at least one person with the at least one name associated with the at least one face to produce at least one enriched textual description.

5. The method of claim 1, further comprising:

determining, by the at least one processor, based on at least one rule, that the at least one identification of the at least one item is associated with the expert recognition machine learning model; and inputting, by the at least one processor, the at least one image into the expert recognition machine learning model in response to the at least one identification of the at least one item being associated with the expert recognition machine learning model.

6. The method of claim 1, further comprising utilizing, by the at least one processor, at least one AI captioning model to generate the at least one textual description based at least in part on the at least one image.

7. The method of claim 1, further comprising:

receiving, by the at least one processor, at least one search query comprising at least one search term;

determining, by the at least one processor, that the at least one search term of the at least one search query matches to the at least one enriched textual description; and returning, by the at least one processor, the at least one image in response to the at least one search query based at least in part on the at least one search term matching to the at least one enriched textual description.

8. The method of claim 1, further comprising:

modifying, by the at least one processor, an order of words in the at least one textual description based at least in part on the at least one heat map and at least one ordering rule.

9. The method of claim 1, wherein the at least one image comprises at least one frame of a video.

10. The method of claim 9, wherein the video comprises a live-stream.

11. A system comprising:

at least one processor that, upon executing software instructions, is configured to:

obtain at least one image;

obtain an artificial intelligence (AI)-generated caption comprising at least one textual description of the at least one image;

wherein the at least one textual description comprises at least one identification of at least one item in the at least one image;

input the at least one image and the at least one textual description into at least one vision transformer model to produce at least one heat map for the at least one image;

wherein the at least one heat map comprises a representation of a degree of significance of at least one portion of the at least one image to the at least one identification of the at least one item in the at least one textual description based at least in part on the at least one gradient;

input the at least one image into an expert recognition machine learning model to output at least one bounding box comprising at least one label representative of the at least one item;

determine for the at least one image, a spatial alignment within the at least one image between the at least one bounding box and the at least one portion of the at least one heat map; and modify the at least one textual description of the AI-generated caption to comprise the at least one label of the at least one item based on the spatial alignment within the at least one image so as to produce a modified AI-generated caption associated with the at least one item.

12. The system of claim 11, wherein the at least one vision transformer model comprises at least one encoder and at decoder; and wherein the at least one image is input into the decoder and output by the encoder to as to produce the at least one heat map.

13. The system of claim 11, wherein the expert recognition machine learning model comprises at least one face recognition machine learning model configured to output at least name associated with at least one face detected in the at least one image.

14. The system of claim 13, wherein the at least one processor is further configured to:

determine at least one person in the at least one image based at least in part on at least one word of the at least one textual description being representative of the at least one person;

determine that the at least one person and the at least one face match based at least in part on the spatial alignment; and modify the at least one textual description by replacing the at least one word associated with the at least one person with the at least one name associated with the at least one face to produce at least one enriched textual description.

15. The system of claim 11, wherein the at least one processor is further configured to:
- determine based on at least one rule, that the at least one identification of the at least one item is associated with the expert recognition machine learning model; and
- input the at least one image into the expert recognition machine learning model in response to the at least one identification of the at least one item being associated with the expert recognition machine learning model.

16. The system of claim 11, wherein the at least one processor is further configured to utilize at least one AI captioning model to generate the at least one textual description based at least in part on the at least one image.

17. The system of claim 11, wherein the at least one processor is further configured to:
- receive at least one search query comprising at least one search term;
- determine that the at least one search term of the at least one search query matches to the at least one enriched textual description; and
- return the at least one image in response to the at least one search query based at least in part on the at least one search term matching to the at least one enriched textual description.

18. The system of claim 11, wherein the at least one processor is further configured to:
- modify an order of words in the at least one textual description based at least in part on the at least one heat map and at least one ordering rule.

19. The system of claim 11, wherein the at least one image comprises at least one frame of a video.

20. The system of claim 19, wherein the video comprises a live-stream.

\* \* \* \* \*